United States Patent
Krishnan et al.

(10) Patent No.: US 10,308,295 B2
(45) Date of Patent: Jun. 4, 2019

(54) INTEGRATED SPOILER CHMSL OPTICAL SENSOR SYSTEM

(71) Applicant: Ford Global Technologies, LLC, Dearborn, MI (US)

(72) Inventors: Venkatesh Krishnan, Canton, MI (US); Harry Lobo, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 42 days.

(21) Appl. No.: 15/680,608

(22) Filed: Aug. 18, 2017

(65) Prior Publication Data
US 2019/0054855 A1    Feb. 21, 2019

(51) Int. Cl.
| | | |
|---|---|---|
| B62D 35/00 | (2006.01) |
| B60Q 1/00 | (2006.01) |
| B60Q 1/44 | (2006.01) |
| B60Q 1/26 | (2006.01) |
| B60S 1/66 | (2006.01) |

(52) U.S. Cl.
CPC ......... B62D 35/007 (2013.01); B60Q 1/0005 (2013.01); B60Q 1/0023 (2013.01); B60Q 1/2661 (2013.01); B60Q 1/44 (2013.01); B60S 1/66 (2013.01)

(58) Field of Classification Search
CPC .. B60Q 1/0005; B60Q 1/0023; B60Q 1/2661; B60Q 1/44; B60S 1/52; B60S 1/56; B62D 35/007
USPC ............................................ 296/180.1, 180.2
See application file for complete search history.

(56) References Cited

U.S. PATENT DOCUMENTS

| | | | | |
|---|---|---|---|---|
| 6,074,078 A | * | 6/2000 | Georgeff ................ | B60Q 1/302 |
| | | | | 222/113 |
| 7,311,351 B1 | * | 12/2007 | Nahm ....................... | B60S 1/52 |
| | | | | 296/180.1 |
| 9,434,357 B2 | * | 9/2016 | Kim .......................... | B60S 1/52 |
| 2003/0090569 A1 | | 5/2003 | Poechmueller | |
| 2013/0088595 A1 | * | 4/2013 | Nauert ..................... | B60Q 1/26 |
| | | | | 348/148 |

(Continued)

FOREIGN PATENT DOCUMENTS

| | | |
|---|---|---|
| CA | 2843453 A1 | 8/2015 |
| DE | 102009031790 A1 | 1/2011 |
| WO | WO-2011018566 A1 * 2/2011 ........... B60Q 1/2661 |

(Continued)

OTHER PUBLICATIONS

English translation of WO 2011/018566; retreived Nov. 26, 2018 via PatentTranslate locate at www.epo.org. (Year: 2018).*

(Continued)

*Primary Examiner* — Jason S Daniels
(74) *Attorney, Agent, or Firm* — Frank A. MacKenzie; Bejin Bieneman PLC

(57) ABSTRACT

A spoiler includes a lower shell, a bracket, a plurality of optical sensors, a CHMSL (center high mounted stop lamp) and an upper shell. The lower shell extends substantially a width of a vehicle roof. The bracket is fixed to the lower shell. The optical sensors are fixed to the bracket. The CHMSL is fixed to one of the lower shell and the bracket. The upper shell is disposed over and fixed to the lower shell. The upper shell has a plurality of sensor apertures aligned with the sensors and a CHMSL aperture aligned with the CHMSL.

21 Claims, 3 Drawing Sheets

(56) References Cited

U.S. PATENT DOCUMENTS

2013/0223091 A1* 8/2013 Inubushi .............. B62D 35/007
                                                            362/549
2015/0323149 A1* 11/2015 Salter .................... F21S 43/13
                                                            362/510

FOREIGN PATENT DOCUMENTS

| WO | 2016025930 A1 | 2/2016 |
| WO | 2016194361 A1 | 12/2016 |
| WO | 2017070246 A1 | 4/2017 |

OTHER PUBLICATIONS

2012 Ford Edge rear spoiler assembly side view.
2012 Ford Edge rear spoiler assembly underside view.

* cited by examiner

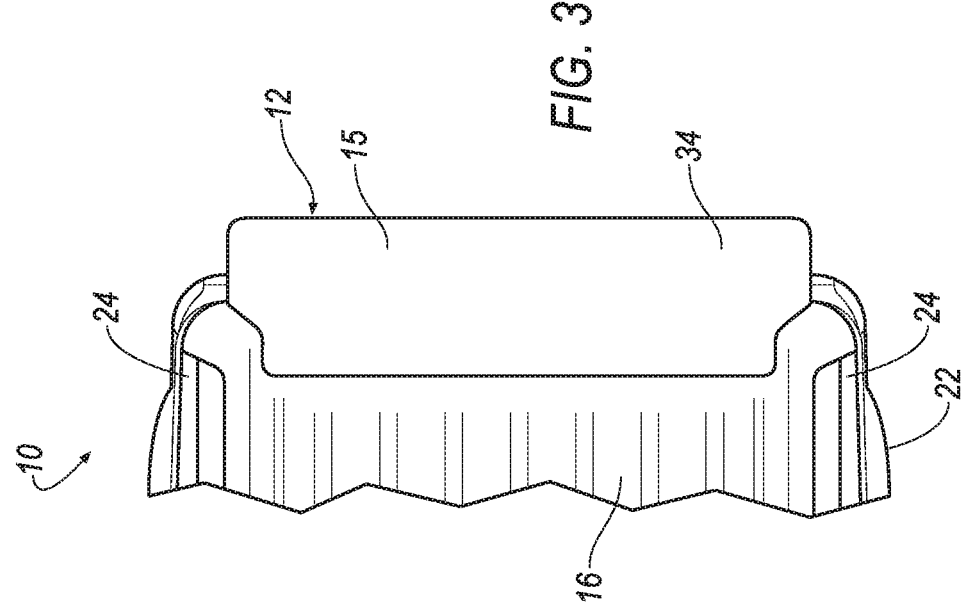
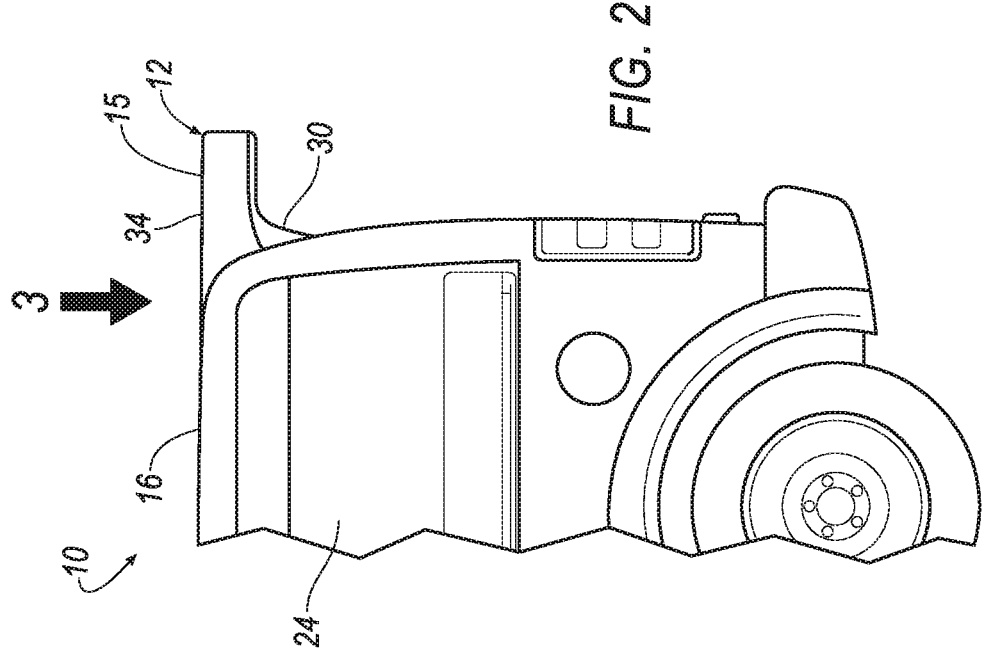

INTEGRATED SPOILER CHMSL OPTICAL SENSOR SYSTEM

BACKGROUND

Autonomous vehicles employ a plurality of sensors to provide a controller or controllers with situational-awareness data including image data indicative of traffic, proximity to other vehicles, traffic control signals, traffic lane locations, etc. Such sensors may include optical sensors, e.g., cameras and LIDAR sensors. One location for optical sensors is a roof of the vehicle. However, placing sensors on the roof may increase a frontal area of the vehicle, increasing its aerodynamic losses. Roof-mounting may also make the sensors more vulnerable to accidental damage, e.g., on entering a low-clearance garage, and in car washes. Placing sensors on the roof may also restrict the styling of the vehicle.

BRIEF DESCRIPTION OF THE DRAWINGS

FIG. 2 is a broken-out side view in the direction of arrow 2 of the vehicle of FIG. 1 with the example spoiler.

FIG. 3 is a broken-out top view in the direction of arrow 3 of the vehicle of FIG. 2 with the example spoiler.

DETAILED DESCRIPTION

Figure 1:
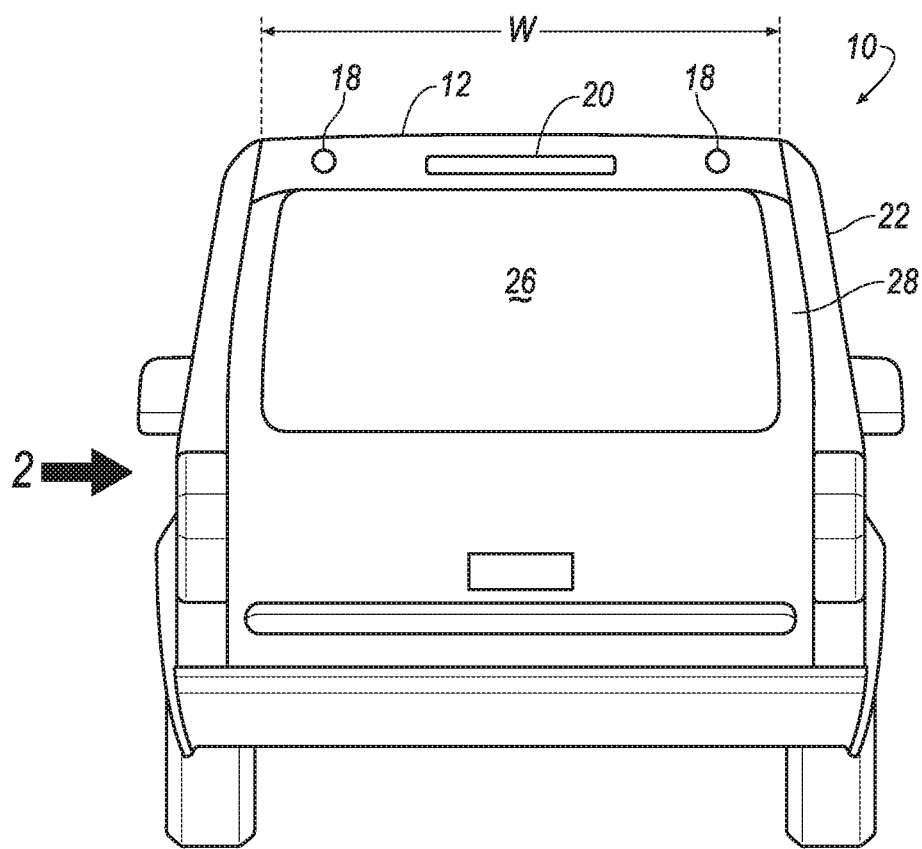
FIG. 1 is a rear view of an example vehicle with an example spoiler.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A spoiler includes a lower shell, a bracket, a plurality of optical sensors, a CHMSL (center high mounted stop lamp) and an upper shell. The lower shell extends substantially a width of a vehicle roof. The bracket is fixed to the lower shell. The optical sensors are fixed to the bracket. The CHMSL is fixed to one of the lower shell and the bracket. The upper shell is disposed over and fixed to the lower shell. The upper shell has a plurality of sensor apertures aligned with the sensors and a CHMSL aperture aligned with the CHMSL.

The bracket may include a plurality of sensor apertures in alignment with the plurality of the sensors.

The spoiler may further include a plurality of window panes disposed across the sensor apertures of one of the bracket and the upper shell.

The window panes may be fixed to the bracket.

The spoiler may further include a plurality of washer nozzles fixed to the one of the bracket and the upper shell to which the window panes are fixed and directed at the window panes.

The spoiler may further include a plurality of fluid lines, each fluid line connected to one of the washer nozzles on a first end and having a connector on a second end.

The washer nozzles may each include a fluid nozzle and a pneumatic nozzle.

The spoiler may further include a plurality of fluid lines and a plurality of pneumatic lines, each fluid line connected to one of the fluid nozzles on a first end and each pneumatic line connected to one of the pneumatic nozzles on a first end, and each fluid line and each pneumatic line having a connector on a second end.

The bracket and the lower shell and the upper shell may all be formed of plastic.

The bracket and the lower shell may be welded to each other.

The bracket may include a plurality of mounting tabs and the lower shell may have an equal plurality of mounting surfaces. The mounting surfaces of the lower shell may be in alignment with the mounting tabs of the bracket. The bracket and lower shell may be welded to each other where the tabs overlap the mounting surfaces.

The lower shell may further include a plurality of support arms on which the mounting surfaces are located.

The CHMSL may be fixed to the lower shell on CHMSL support tabs. The CHMSL may be aligned with the CHMSL aperture in the upper shell.

The upper shell may be removably fixed to the lower shell.

The bracket may further include a receiving aperture aligned with and receiving the sensor.

The bracket may further include a sensor mounting feature.

The sensor mounting feature may include a plurality of dimples.

A spoiler includes a lower shell, a bracket, a plurality of optical sensors, a CHMSL, an upper shell, a plurality of window panes, and a plurality of washer nozzles. The lower shell extends substantially a width of a vehicle roof. The bracket is fixed to the lower shell and has a plurality of sensor apertures. The optical sensors are fixed to the bracket and are in alignment with the plurality of the sensor apertures. The CHMSL is fixed to one of the lower shell and the bracket. The upper shell is disposed over and fixed to the lower shell. The upper shell has a plurality of sensor apertures aligned the sensors and a CHMSL aperture aligned with the CHMSL. The window panes are disposed across the sensor apertures of one of the bracket and the upper shell. The washer nozzles are fixed to the one of the bracket and the upper shell to which the window panes are fixed. The washer nozzles are directed at the window panes.

The CHMSL may be fixed to the lower shell on CHMSL support tabs. The CHSML may be aligned with the CHMSL aperture in the upper shell.

The upper shell may be removably fixed to the lower shell.

A vehicle 10 may include a trim piece, e.g., a rear spoiler 12, mounted high on the vehicle 10, e.g., at or in alignment with a roof 16 of the vehicle 10. The example spoiler 12 may have an upper surface 15 that is in alignment and has continuity with the roof 16, i.e., a smooth transition from the spoiler to the roof 16, of the vehicle 10. The spoiler 12 includes sensors 18 and may include a center high-mounted stop lamp (a "CHMSL") 20.

The vehicle 10 may be operable in a non-autonomous, a semiautonomous mode, i.e., a partly autonomous mode of operation requiring some, i.e., occasional, human driver intervention, or a fully autonomous mode, i.e., a fully autonomous mode requiring no human driver intervention. For purposes of this disclosure, an autonomous mode is defined as one in which each of vehicle 10 propulsion (e.g., via a powertrain including an electric motor and/or an internal combustion engine), braking, and steering are controlled by an autonomous vehicle controller, i.e., a computing device (or devices); in a semi-autonomous mode the controller controls one or two of vehicle 10 propulsion, braking, and steering.

The vehicle 10 includes a vehicle body 22 of which the roof 16 may be an uppermost part. The vehicle body 22 may include windows, e.g., a front windshield, i.e. a windscreen (not shown), to allow forward viewing by passengers, as well as side windows 24 and a rear window 26. The vehicle body 22 also accommodates and encloses operating components, e.g., a drive motor or motors, a speed change gear box, steering system, and energy storage devices such as batteries and fuel tanks. Such components may be mounted below a passenger cabin or in front of or behind the passenger cabin. The illustrated example vehicle body 22 may include a rear hatch 28 in which the rear window 26 may be mounted.

The vehicle 10 may employ a sensor system including a plurality of sensors providing the controller or controllers (not shown) with situational-awareness data including image data indicative of traffic, proximity to other vehicles, traffic control signals, traffic lane locations, etc. Such sensors may include optical sensors 18, i.e., sensors that provide image data such as cameras and light detection and ranging ("LIDAR") sensors. One location for rearward directed sensors 18 is in the rear spoiler 12. The sensors 18 may be disposed within the spoiler 12.

The spoiler 12 includes a lower shell 30, a carrier bracket 32 fixed to the lower shell 30, and an upper shell 34. The upper shell 34 is disposed over the lower shell 30 and the carrier bracket 32. The lower shell 30 extends substantially a width W of the vehicle roof 16. When connected to the hatch 28, the spoiler 12 may include lateral extensions (not shown) that extend beyond the hatch 28, allowing the spoiler 12 to extend across the full width of the vehicle 10.

A plurality of the sensors 18 may be fixed to the bracket 32. The CHMSL 20 may be fixed to one of the lower shell 30 and the bracket 32. The upper shell 34 may have a sensor aperture 35 aligned with each of the sensors 18. Depending on the configuration of the bracket 32, the bracket 32 may also include a sensor aperture 36 aligned with each of the sensors 18 and apertures 35. The upper shell 34 may also include a first CHMSL aperture 37 aligned with the CHMSL 20 and a second CHMSL aperture 43 in the bracket 32.

Window panes 38 may be placed across the sensor apertures 35 of to close the apertures 35 in the upper shell 34 to protect the sensors 18 from moisture and debris. The window panes 38 are fixed to the upper shell 34. Such window panes 38 may be supplemental to protective window panes, that may be incorporated into the sensors 18. Alternatively, the window panes 38 may be fixed to the bracket 32 and placed across the apertures 36 therein.

The window panes 38 are transparent for light frequencies to which the sensors 18 are sensitive, allowing a substantially unimpeded transmittal of light therethrough. The window panes 38 may be formed of a transparent thermoplastic, e.g., acrylic glass, or polycarbonate material. Other example transparent materials include silicate glass, including laminated glass, and titanium dioxide in its transparent form.

The rear sensors 18 may be used for autonomous vehicle operation. The sensors 18 require a predetermined amount of cleanliness, i.e., lack of light-obstructing material on the sensor or a window pane in front of the sensor, to function as intended. The rear of the vehicle 10 may collect enough dirt from splashes and air-born particles to affect the operation of the sensors 18. When the sensors 18 or their window panes 38 are not sufficiently clean to maintain safe operation, the vehicle 10 may have to stop. The sensors 18 need to have a substantially unobstructed view to allow operation of the vehicle 10 in the autonomous mode. Accordingly, the window panes 38 need to be kept clean. Additionally, because of their critical role in the operation of the vehicle 10, the sensors 18 need to be accessible for servicing in the event of any service needs.

Figure 4:
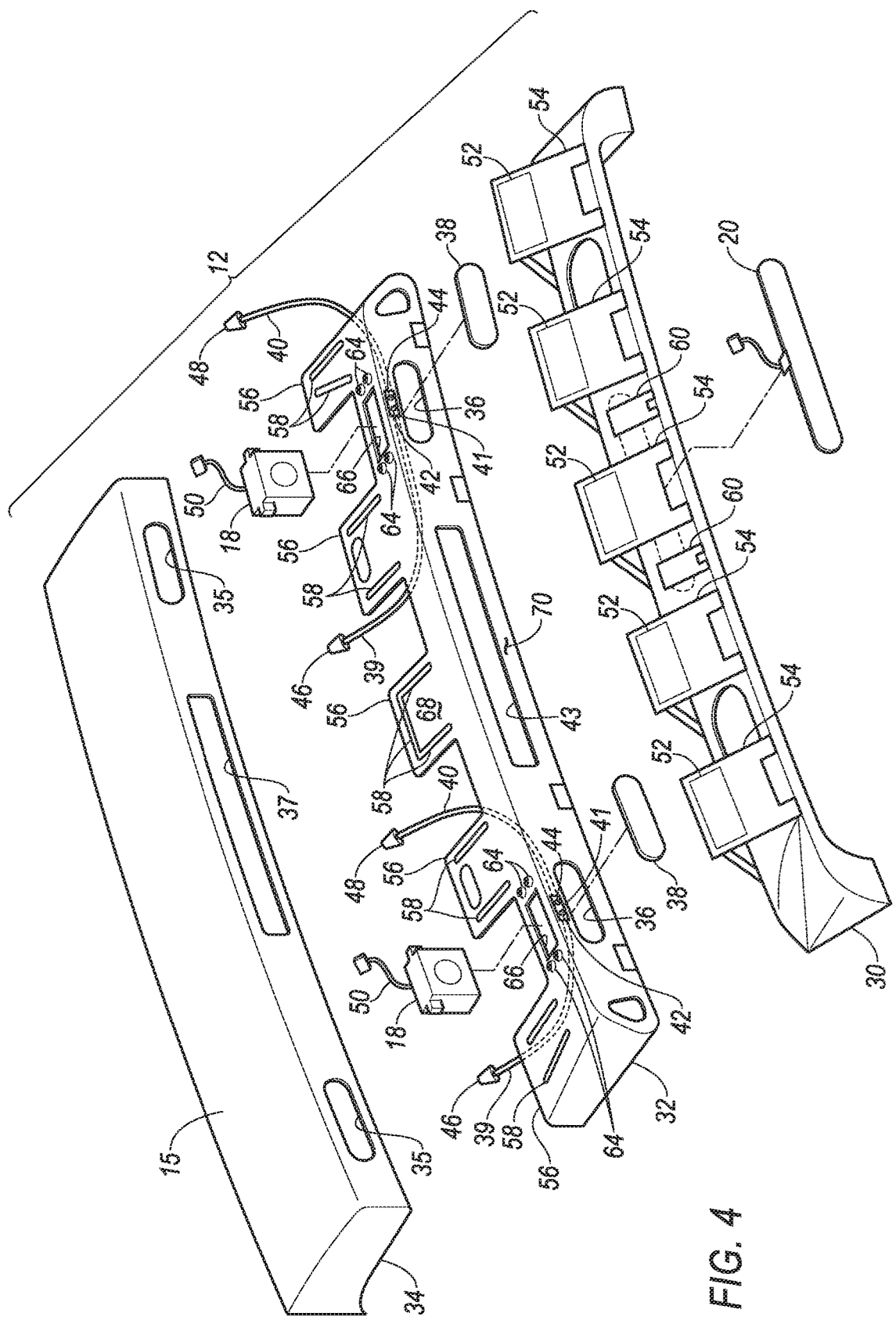
FIG. 4 is an exploded view of the example spoiler of FIGS. 1-3.

FIG. 4 shows example pneumatic and fluid lines, i.e., tubes, 39 and 40 respectively, for connecting pneumatic and fluid pumps (not shown) to an example washer nozzle 41 including a pneumatic nozzle 42 and a fluid nozzle 44. Washer nozzles 41 may be fixed to the bracket 32, above the window panes 38. When window panes 38 are installed across the apertures 35 in the upper shell 34, the washer nozzles 41 may be fixed to the upper shell 34 above the window panes 38. The pneumatic and fluid lines 39, 40, i.e., supply lines, may be connected to supply air from the pneumatic pump and fluid, i.e., liquid, from the fluid pump via a pneumatic supply line connector 46 and a liquid supply line connector 48 respectively. Example automated washing systems for optical sensors are commercially available from dhlBowles.

One washer nozzle 41 may be fixed to one of the bracket 32 and the lower shell 30. The nozzles 42, 44 may be positioned proximate to the window panes 38 in one of the upper shell 34 and the carrier bracket 32, and fixed to the one of the upper shell 3 and the carrier bracket 32. Proximate in this context means that the nozzles 42, 44 are close enough to respective window panes 38 to effectively deliver air and/or fluid; i.e., as will be understood, the proximity of locations and orientations of the nozzles 42, 44 may depend on a design of the nozzles 42, 44 and on an expected range of pressure of the air and fluid being dispensed by the nozzles 42, 44.

FIG. 4 also shows electrical lines 50 that may be used to connect to the sensors 18. Such electrical lines 50 may be used to provide electrical power to the sensors 18 and may be used to communicate data signals from the sensors 18 to the controller.

Each of the lower shell 30, carrier bracket 32 and upper shell 34 are rigid, which in the context of this disclosure means that each of the constituent elements of the spoiler 12, i.e., the lower shell 30, the bracket 32, and the upper shell 34 may be deformable, but are provided with a predetermined stiffness to resist deformation. At a minimum, the assembled spoiler, including the lower shell 30, carrier bracket 32 and upper shell, 34 resists visible deformation under its own weight. Stiffer elements 30, 32, 34 may allow the sensors 18 to provide improved operation by reducing a magnitude of sensor vibration responsive to vehicle suspension vibration inputs as may be induced by operation over rough roads. The elements 30, 32, 34 may be formed of any suitable material including aluminum, steel, polymers, e.g., plastics, including composite materials, e.g., a polymer, e.g., thermoplastic, resin substrate reinforced by fibers, e.g., carbon fiber, glass fiber, aramid fiber, basalt fiber.

Each of the lower shell 30, carrier bracket 32 and upper shell 34 are configured to provide an optimal strength-to-weight ratio. The strength-to-weight ratios are typically understood as being more beneficial as they increase. However, as is also understood, there are limits to the achievable strength-to-weight ratios imposed by factors that may include performance constraints of available materials and manufacturing and material costs of the lower shell 30, carrier bracket 32 and upper shell 34. When the spoiler 12 is located on the hatch 14, it is particularly beneficial to have as light a spoiler 12 as possible to minimize certain operating parameters, e.g., hatch opening effort. Forming the lower shell 30, the bracket 32 and the upper shell 34 of plastic will provide a spoiler sufficiently light in weight.

The bracket 32 and the lower shell 30 may be permanently fixed to each other, as by welding. When the bracket 32 and lower shell 30 are both formed of plastic, such welding may depend on the type or types of plastic used. Methods of welding plastic may include, by way of example, heat welding, friction welding, ultrasonic welding, radio frequency welding, laser welding and solvent welding.

The lower shell 30 may include a plurality of mounting surfaces 52 disposed on support arms 54 of the lower shell 30. The support arms 54 may be aligned with bracket mounting tabs 56, equal in number to the support arms 54 of the lower 30, and in alignment therewith. The support arms 54 and the tabs 56 are in engagement with each other in a mounted position, with the arms 54 and the tabs 56 providing the mounting surfaces 52 that are in engagement with mounting surfaces of the mounting tabs 56 that may include weld beads 58.

The lower shell 30 may include support tabs 60 that receive and support the CHMSL 20 in a position aligned with the CHMSL window aperture 37.

The bracket 32 may also include sensor mounting features which aid in locating the sensors 18 on the bracket 32. The mounting features may include a plurality of locating dimples 64 and a receiving aperture 66, with the dimples 64 surrounding the receiving aperture 66 in a first surface 68 of the bracket 32. The first surface 68 may be at an angle, e.g., 90 degrees, to a second surface 70 in which the sensor apertures 36 may be located.

The bracket 32 may further include features (not shown) for guiding and retaining the supply lines 39, 40 and electrical lines 50. Example guiding and retaining features may be found in commercially available spoilers, e.g., a hose-connection tower as found in a spoiler of a 2012 Edge® model vehicle from the Ford Motor Company.

The upper shell 34 may be removably fixed, i.e., fixed so that the upper shell 34 may be removed and reinstalled without damage, e.g., by threaded fasteners (not shown), to the lower shell 30 and the bracket 32 to allow servicing of the components, e.g., sensors 18 and nozzles 42, 44, incorporated within the spoiler 12.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A spoiler, comprising:
   a lower shell extending substantially a width of a vehicle roof;
   a bracket fixed to the lower shell;
   a plurality of optical sensors fixed to the bracket, wherein the bracket has a plurality of sensor apertures in alignment with the plurality of the sensors;
   a CHMSL fixed to one of the lower shell and the bracket;
   an upper shell disposed over and fixed to the lower shell, and having a plurality of sensor apertures aligned with the sensors and a CHMSL aperture aligned with the CHMSL; and
   a plurality of window panes disposed across the sensor apertures of one of the bracket and the upper shell.

2. The spoiler of claim 1, wherein the window panes are fixed to the bracket.

3. The spoiler of claim 1, further comprising a plurality of washer nozzles fixed to the one of the bracket and the upper shell to which the window panes are fixed and directed at the window panes.

4. The spoiler of claim 3, further comprising a plurality of fluid lines, each fluid line connected to one of the washer nozzles on a first end and having a connector on a second end.

5. The spoiler of claim 3, wherein the washer nozzles each include a fluid nozzle and a pneumatic nozzle.

6. The spoiler of claim 5, further comprising a plurality of fluid lines and a plurality of pneumatic lines, each fluid line connected to one of the fluid nozzles on a first end and each pneumatic line connected to one of the pneumatic nozzles on a first end, and each fluid line and each pneumatic line having a connector on a second end.

7. The spoiler of claim 1, wherein the bracket and the lower shell and the upper shell are all formed of plastic.

8. The spoiler of claim 7, wherein the bracket and the lower shell are welded to each other.

9. The spoiler of claim 1, wherein the bracket includes a plurality of mounting tabs and the lower shell has an equal plurality of mounting surfaces and the mounting surfaces of the lower shell are in alignment with the mounting tabs of the bracket and the bracket and lower shell are welded to each other where the tabs overlap the mounting surfaces.

10. The spoiler of claim 9, the lower shell further including a plurality of support arms on which the mounting surfaces are located.

11. The spoiler of claim 1, wherein the CHMSL is fixed to the lower shell on CHMSL support tabs and is aligned with the CHMSL aperture in the upper shell.

12. The spoiler of claim 1, wherein the upper shell is removably fixed to the lower shell.

13. The spoiler of claim 1, the bracket further including a receiving aperture aligned with and receiving the sensor.

14. The spoiler of claim 1, the bracket further including a sensor mounting feature.

15. The spoiler of claim 14, the sensor mounting feature including a plurality of dimples.

16. A spoiler comprising:
   a lower shell extending substantially a width of a vehicle roof;
   a bracket fixed to the lower shell and having a plurality of sensor apertures;
   a plurality of optical sensors fixed to the bracket and in alignment with the plurality of the sensor apertures;
   a CHMSL fixed to one of the lower shell and the bracket;

an upper shell disposed over and fixed to the lower shell, and having a plurality of sensor apertures aligned the sensors and a CHMSL aperture aligned with the CHMSL;

a plurality of window panes disposed across the sensor apertures of one of the bracket and the upper shell; and a plurality of washer nozzles fixed to the one of the bracket and the upper shell to which the window panes are fixed and directed at the window panes.

17. The spoiler of claim 16, wherein the CHMSL is fixed to the lower shell on CHMSL support tabs and is aligned with the CHMSL aperture in the upper shell.

18. The spoiler of claim 16, wherein the upper shell is removably fixed to the lower shell.

19. A spoiler, comprising:
a lower shell extending substantially a width of a vehicle roof;
a bracket fixed to the lower shell;
a plurality of optical sensors fixed to the bracket;
a CHMSL fixed to one of the lower shell and the bracket; and
an upper shell disposed over and fixed to the lower shell, and having a plurality of sensor apertures aligned with the sensors and a CHMSL aperture aligned with the CHMSL;
wherein the bracket includes a plurality of mounting tabs and the lower shell has an equal plurality of mounting surfaces and the mounting surfaces of the lower shell are in alignment with the mounting tabs of the bracket and the bracket and lower shell are welded to each other where the tabs overlap the mounting surfaces.

20. A spoiler, comprising:
a lower shell extending substantially a width of a vehicle roof;
a bracket fixed to the lower shell;
a plurality of optical sensors fixed to the bracket;
a CHMSL fixed to one of the lower shell and the bracket; and
an upper shell disposed over and fixed to the lower shell, and having a plurality of sensor apertures aligned with the sensors and a CHMSL aperture aligned with the CHMSL;
wherein the upper shell is removably fixed to the lower shell.

21. A spoiler, comprising:
a lower shell extending substantially a width of a vehicle roof;
a bracket fixed to the lower shell, the bracket further including a sensor mounting feature, the sensor mounting feature including a plurality of dimples;
a plurality of optical sensors fixed to the bracket;
a CHMSL fixed to one of the lower shell and the bracket; and
an upper shell disposed over and fixed to the lower shell, and having a plurality of sensor apertures aligned with the sensors and a CHMSL aperture aligned with the CHMSL.

* * * * *